United States Patent [19]

Lehman et al.

[11] Patent Number: 4,947,174

[45] Date of Patent: Aug. 7, 1990

[54] VEHICLE SHIELD

[75] Inventors: Theodore H. Lehman, Las Cruces, N. Mex.; William P. Manning, Tulsa, Okla.

[73] Assignee: Rockwell International Corporation, El Segundo, Calif.

[21] Appl. No.: 802,310

[22] Filed: Feb. 24, 1969

[51] Int. Cl.[5] ........................ H01Q 17/00; B64G 1/22; B64G 1/54

[52] U.S. Cl. .................................... 342/3; 244/158 R; 244/121

[58] Field of Search ........................... 343/18 A, 18 B; 342/1–4; 244/158 R

[56] References Cited

U.S. PATENT DOCUMENTS

| | | | |
|---|---|---|---|
| 2,801,411 | 7/1957 | Weinstock | 343/18 A |
| 3,152,328 | 10/1964 | McMillan | 343/18 A |
| 3,233,238 | 2/1966 | Barker | 343/18 A |

*Primary Examiner*—Gilberto Barrón, Jr.
*Attorney, Agent, or Firm*—Charles T. Silberberg

[57] ABSTRACT

A radar attenuator shield for a space vehicle is described having an open shell of radar attenuating material presenting a smooth external surface on one side and open on the opposite side in the general shape of a bathtub. The space vehicle is ensconced within the open side for minimizing radar echo. In a preferred embodiment the external surface of the radar attenuator shield is in the form of a semi-cylinder with one-fourth of a sphere at each end thereof.

1 Claim, 1 Drawing Sheet

VEHICLE SHIELD

BACKGROUND

In many situations it is desirable to provide a radar attenuating surface on or surrounding a structure or vehicle in order to minimixe the ability of an enemy to detect or track the vehicle. In order to provide effective radar attenuation by interference techiniques at very low radar frequencies it is usually necessary to employ a relatively thick structure at the surface. This thick structure may make the transport of the vehicle difficult because of its bulkiness.

A vehicle in which the transport problem is particularly acute comprises a space vechicle such as a satellite or the like. In such a vehicle it may be desirable to reduce the radar echo to reduce the possibility of detection and to make precise tracking of the vehicle more difficult. Since radar echos from a vehicle may provide significant information concerning the mass and geometry of the vehicle it may also be desirable to change the radar echo characteristics to conceal the nature and purpose of a space vehicle.

BRIEF SUMMARY OF THE INVENTION

Thus in the practice of this invention according to a preferred embodiment there is provided a radar attenuator shield for an attitude stabilized space vehicle comprising an open shell of radar attenuating material having a smooth external surface on a side facing toward a potential radar threat and open on the opposite side. The space vehicle is arranged within the open side of the shell for camouflage from potential radar threats.

DRAWINGS

Objects and many of the attendent advantages of this invention will be readily appreciated as the same becomes better understood by reference to the following description when considered in conjunction with the accompanying drawings wherein.

Figure 1:
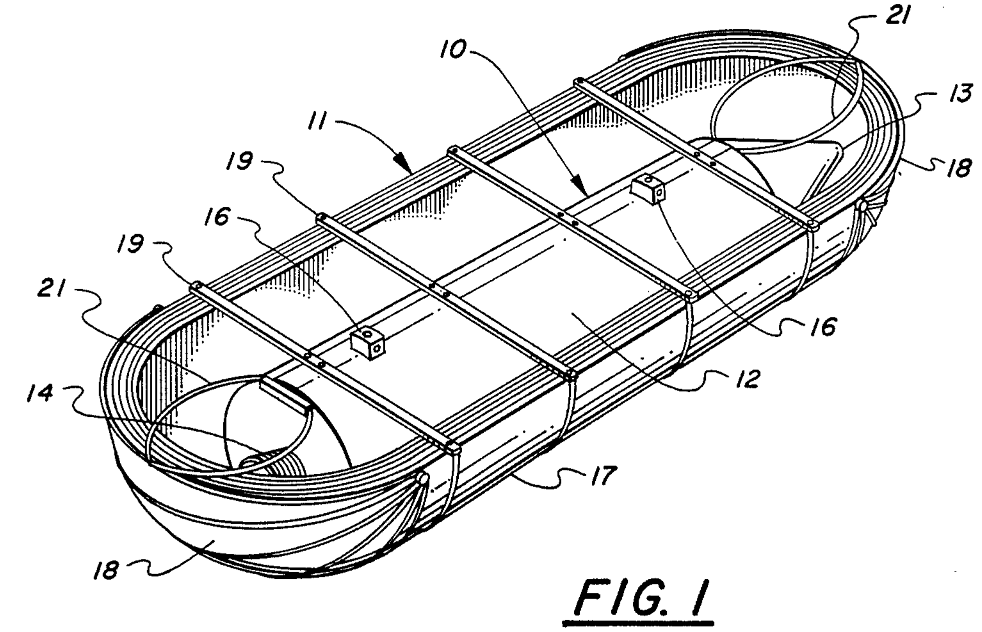
FIG. 1 illustrates in perspective a space vehicle within a bathtub shaped shield of radar attenuating material.

FIG. 1 illustrates in perspective a spacecraft or satellite 10 ensconced in a shield 11 of radar attenuating material. As illustrated in this embodiment the vehicle comprises a cylindrical body 12 with a conical forward portion 13 and a rocket engine 14 at the aft end. Such a vehicle 10 will obviously have many subsystems on board which are of substantially no concern in the practice of this invention. One conventional subsystem of interest is employed for stabilizing the space vehicle in a uniform orientation relative to the surface of the earth. Such orientation is readily provided by conventional control systems employing horizon sensors (not shown) or the like to measure orientation and small rocket engines 16 on the sides of the vehicle for obtaining roll, pitch and yaw control in a conventional manner. This provides an attitude stabilized vehicle which can readily maintain a constant orientation relative to the earth's surface.

By maintaining a constant attitude a radar echo from the space vehicle is relatively fixed and varies mainly with location of the searching radar relative to the vehicle. That is, whether the vehicle is directly overhead or presents a forward, sideward, or aft aspect to the searching radar. In many space vehicles the external geometry includes apertures, antennas, rocket engines, and other miscellaneous protrusions or openings which may provide substantial radar echos and thereby enhance the ability of an enemy to detect or track the space vehicle.

Radar reflection from a vehicle is not merely determined by the size of the vehicle but more particularly by its geometry. In a vehicle that is large relative to wavelength of the radar, the surface acts in the manner of a specular reflector, bouncing radar waves off according to the usual laws of reflection. For this reason, a large flat plate, for example, has a very high radar echo when exactly normal to the radar beam, but the echo falls off very rapidly for small angles off normal. Thus a large, smooth vehicle may have a small radar echo except at specific viewing angles.

If, however, the dimensions of an object are of the same order as the wavelength of the radar, diffraction, surface wave phenomena and the like, become of significance and the object acts more like an isotropic radiator of radar. Such an object may reflect the same total radar energy, but spreads the echo over a much larger angle so that the probability of detection is increased. This effect produces high reflections from a vehicle with projections, depressions, or other small structural members. Further, the space vehicle itself may have characteristic dimensions of the same order as the wavelength of low frequency radar and give high reflections over wide angles. Thus, surprisingly, increasing the apparent size of a vehicle may reduce radar echo at some viewing angles.

In order to minimize the radar echo from surface irregularities in a spacecraft a surrounding shield of radar attenuator material 11 may be provided, having a total thickness of two feet or more. By providing a smooth shield or shell of radar attenuator material it is assured that the apparent external geometry of the space vehicle is smooth so that no radar "hot spots" are found due to structural members, antenna, camera apertures, rocket engines, or the like. By employing a radar attenuator material the overall radar echo from the vehicle is also substantially reduced. Thus the radar camouflage not only reduces ability to detect and track the vehicle but also obscures the radar signature of the vehicle to conceal its characteristics even if it is detected.

Electromagnetic waves such as radar may be absorbed or attenuated by socalled quarter wave or Salisbury screen which comprises a thin layer of material having an impedance of about 377 ohms per square, which is the characteristic impedance of free space, spaced exactly one-quarter wavelength from a reflective surface. Such an absorber is described in U.S. Pat. No. 2,599,944. Since an absorber of this type prevents radar reflection by a mechanism of destructive interference at one-quarter wavelength from a reflective surface it is found to be highly sensitive to frequency and will attenuate radar only within a narrow frequency band. It is found, however, that such an interference absorber also attenuates radiation at odd multiples of one-quarter wavelengths.

Further, it is found that a plurality of resistive layers or sheets individually spaced from a reflective surface at different distances each attenuate radiation at different wavelengths and a broad band radar attenuator can be achieved. The impedance of these excessive layers spaced apart from the reflective surface and the spacing therebetween is governed by interactions between the successive sheets and these sheets may not each be provided with an impedance of 377 ohms per square. In general it is found that the first sheet upon which radar is expected to impinge should have an effective impedance as seen by an incoming radar wave of about 377 ohms per square in order to have minimal reflection therefrom. Successive sheets between the outermost layer and the reflective layer have successively lower effective impedance down to the substantially zero impedance of the reflective layer. The effective impedance of each layer is determined not only by the impedance of that layer but also the impedances of the various underlying layers. The selection of impedances for the various sheets and the spacing therebetween are readily determined for particular frequency ranges of attenuation by one skilled in the art.

It is preferred that the sheets have d.c. resistivities in the range of from about 40 to 2,000 ohms per square to provide effective attenuation in a multilayer broad band radar attenuator. If desired, the layers may have capacitance and inductance at radar frequencies as well as d.c. resistivity for providing greater design flexibility in the radar attenuator. In general, the total thickness of attenuator spaced from the reflective layer is determined by the longest wavelength of radar to be attenuated; this distance approximating one-quarter of the longest wavelength of the radiation. The distance between successive sheets is likewise determined by reference to the shortest wavelength it is desired to attenuate; this distance being approximated by one-quarter of the shortest wavelength.

Previously, interference type attenuators have been formed of carbon loaded fabric sheets spaced apart by non-metallic honeycomb materials or have comprised similar relatively heavy and rigid structures. These absorbers are unduly heavy and bulky for application in most space situations.

Radar attenuating materials suitable for use in this invention and capable of attenuating radar beams over a substantial range of frequencies are described and claimed in copending U.S. patent application Ser. No. 670,828 now U.S. Pat. No. 4,044,358 entitled, "Self Erectable Structure", by William P. Manning and Louis Maus, and assigned to North American Rockwell Corporation, Assignee of this invention. Broadly, this radar attenuator comprises a plurality of sheets of light weight metallized plastic appropriately spaced apart and having particular electrical characteristics for absorbing radar energy by an interference phenomenom. The inner-most sheet in such a radar attenuator comprises a metal foil, for example, which is opaque and reflective to radar and therefore obscures any structure behind the radar attenuating material. As is well-known and pointed out in the aforementioned copending patent application, the echo of a radar beam from the interference type radar attenuator is substantially less than the radar echo from a metal surface of the same geometry.

In order to provide a radar attenuating shield for a space vehicle it is desirable that the structure be light in weight and have a geometry suitable for deployment from a stowed configuration to a deployed configuration. This permits launch of the space vehicle with the radar attenuating shield contained within suitable aerodynamic shrouds and permits deployment of the radar attenuating shield after the space vehicle reaches space and aerodynamic drag is no longer a problem. Suitable techniques for deploying a radar attenuating material from a stowed position are described and illustrated in the aforementioned copending U.S. patent application and also in copending U.S. Pat. No. 4,314,682 entitled "Deployable Shield" by Burton Barnett, Martin R. Kinsler, and Lyle A. Nelson, filed on the same date as this application and assigned to North American Rockwell Corporation, the Assignee of this application. The deployment techniques per se are not a portion of this invention and are set forth in detail in the aforementioned copending applications which are hereby incorporated by reference with full force and effect as if set forth in full herein.

In a preferred embodiment the shield 11 of radar attenuating material is in the shape of an open shell or bathtub having a cylindrical central portion 17 and end portions 18 each in the form of one quarter of a sphere. The cylindrical portion 17 and spherical portions 18 each have an inner radius approximately the same as the diameter of the space vehicle 10. Thus the space vehicle fits substantially completely within the open side of the radar attenuating shell 11 and does not extend a substantial distance thereabove except as may be required to provide clearance for exhaust from the attitude control rockets 16. By ensconsing the space vehicle substantially completely within the radar attenuating shell the radar camouflage is maintained over substantially all aspects as might be viewed by an earthbound radar even if the satellite is on the horizon as viewed by the earthbound radar. By employing a radar attenuating shield larger than the space vehicle and extending the shield up to substantially the highest point on the vehicle for shielding the vehicle from ground based radar, the entire upper side of the space vehicle is left free for various subsystems such as the attitude control rockets 16, star trackers (not shown), solar cells (not shown), or communication antennas (not shown) for communicating to the earth by way of a synchronous satellite stationed high above the earth's surface. With such an arrangement radar camouflage is obtained without seriously handicapping the functions of the space vehicle. Further, by employing a radar attenuating shield larger than the vehicle, the resonant reflection of low frequency radar is also reduced.

In order to secure the shield 11 to the space vehicle 10 cross members 19 are secured to the vehicle structure on the top side thereof as arranged in orbit, and support the shield 11 at the ends of the cross members 19. In a similar manner loop type supports 21 may be employed at the ends of the space vehicle for supporting the spherical portions 18 of the radar attenuating shield. The cross members 19 and loop type supports 21 may also be employed in deployment of the radar attenuating shield as described and illustrated in the aforementioned copending application entitled, "Deployable Shield".

Figure 2:
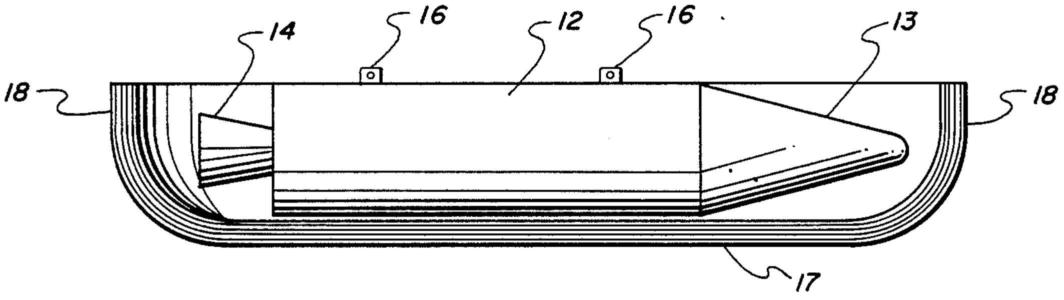
FIG. 2 illustrates a transverse section of a combination as illustrated in FIG. 1.
Figure 3:
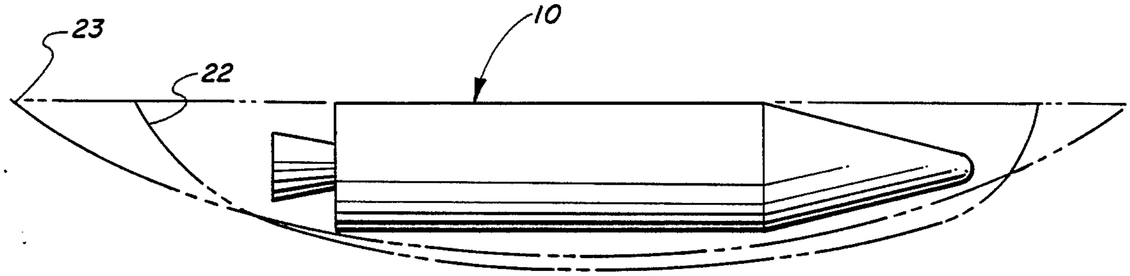
FIG. 3 shows alternative shapes for the radar attenuator shield.

FIG. 3 illustrates schematically two alternative embodiments useful for providing an open shell of radar attenuating material having a smooth external surface on a side facing toward a potential radar threat. In the preferred embodiment of FIGS. 1 and 2 the radar attenuating shield has a semi-cylindrical center portion and quarter spherical end caps forming the bathtub-like open shell. The preferred shape of a semi-cylinder with spherical end caps is advantageous not only in providing a minimal radar cross section in most viewing angles, but also is readily amenable to automatic deployment in orbit.

In FIG. 3 two other potential external shapes for the radar attenuator material are illustrated schematically. Thus, for example, the space vehicle 10 may be shielded by a radar attenuating material having the shape of an ellipsoid 22; similarly, the radar attenuating shield may have the external shape of an ogive 23. It will be apparent to one skilled in the art that other figures of revolution are readily employed for providing an open sided shell of radar attenuating material presenting a smooth external countenance to a ground based radar.

What is claimed is:

1. A radar attenuator shield for an attitude stabilized space vehicle comprising:

a shell having a smooth completely convex surface for containing said vehicle, said shell having an opening and having a shape such that the mid-portion is one half of a cylindrical tubular form and each of the ends is one fourth of a spherical form, said shell being made of a material comprising of a plurality of spaced apart attenuator sheets and reflective sheets, said cylindrical tubular form having an interior radius equal to at least the overall diameter of said vehicle and a length such that said vehicle is contained within said shield, and struts disposed across said opening to secure said vehicle within the shell.

* * * * *